United States Patent
Wei

(10) Patent No.: US 6,386,330 B1
(45) Date of Patent: May 14, 2002

(54) SKID SCOOTER

(76) Inventor: Hao-Chan Wei, 58, Ma Yuan West St., Taichung (TW)

( * ) Notice: Subject to any disclaimer, the term of this patent is extended or adjusted under 35 U.S.C. 154(b) by 0 days.

(21) Appl. No.: 09/803,695

(22) Filed: Mar. 9, 2001

(51) Int. Cl.[7] ................................................. B60T 1/00
(52) U.S. Cl. ............................................. 188/29; 188/19
(58) Field of Search ........................... 188/19, 29, 1.12, 188/20, 72.1; 280/87.041, 87.042, 87.021, 11.2, 152.2, 160.1

(56) References Cited

U.S. PATENT DOCUMENTS 5,383,536 A * 1/1995 Butter et al. .................. 188/19
5,927,733 A * 7/1999 Banda .......................... 188/19
6,296,082 B1 * 10/2001 Tsai ............................. 188/19
6,298,952 B1 * 10/2001 Tsai ............................. 188/29

* cited by examiner

Primary Examiner—Paul N. Dickson
Assistant Examiner—Melanie Torres

(57) ABSTRACT

A skid scooter has a board, a holding seat disposed on a front portion of the board, a down tube inserted in the holding seat, a front tube connected to the down tube, a handle connected to the front tube, a front wheel disposed on a bottom of the front tube, a rear wheel disposed on a rear end of the board, a rear wheel cover disposed between the board and the rear wheel, and a rear wheel brake device disposed in the rear wheel cover.

3 Claims, 5 Drawing Sheets

SKID SCOOTER

BACKGROUND OF THE INVENTION

The present invention relates to a skid scooter. More particularly, the present invention relates to a skid scooter which has a rear wheel brake device.

Referring to FIG. 6, a conventional rear wheel brake device of a skid scooter has a main frame 21, a rear wheel 23, a rear wheel cover 31, a rear wheel support frame 25 connected to the main frame 21 and the rear wheel 23, and an elastic plate 32 having a proximal end 321 and a distal end 322. The main frame 21 has a through hole 211. A bolt 33 fastens the proximal end 321 of the elastic plate 32 and the main frame 21 together through the through hole 211 of the main frame 21. The rear wheel cover 31 has a curved portion 311 to contact the rear wheel 23 in order to break the rear wheel 23.

SUMMARY OF THE INVENTION

An object of the present invention is to provide a skid scooter which has a rear wheel brake device to brake a rear wheel efficiently.

Accordingly, a skid scooter comprises a board, a holding seat disposed on a front portion of The board, a down tube inserted in the holding seat, a front tube connected to the down tube, a handle connected to the front tube, a front wheel disposed on a bottom of the front tube, a rear wheel disposed on a rear end of the board, a rear wheel cover disposed between the board and the rear wheel, and a rear wheel brake device disposed in the rear wheel cover. The rear wheel cover has an oblong hole. The rear wheel brake device has a positioning block inserted in the oblong hole of the rear wheel cover, two posts disposed on the positioning block, and two springs enclosing the posts. The positioning block has a through hole and a periphery flange. An oblong seat has an interior. A movable cover has a lower protruded block passing through the through hole of the positioning block and inserted in the interior of the oblong seat. A shaft fastens the board, the rear wheel, and the rear wheel cover together. Two bolts fasten the oblong seat and the movable cover together. The springs contact the movable cover.

DETAILED DESCRIPTION OF THE INVENTION

Figure 1:
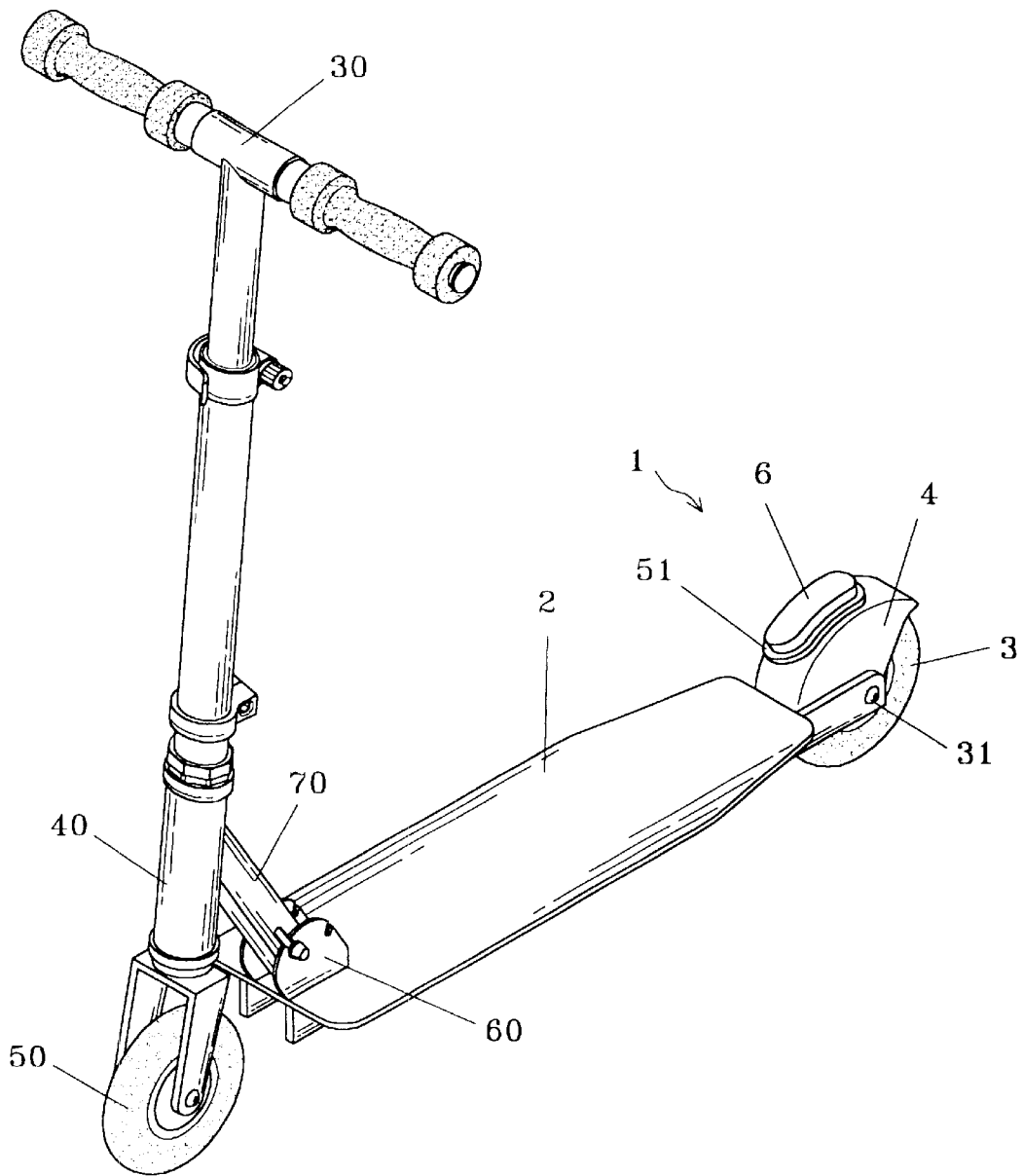
FIG. 1 is a perspective assembly view of a skid scooter of a preferred embodiment in accordance with the present invention.
Figure 2:
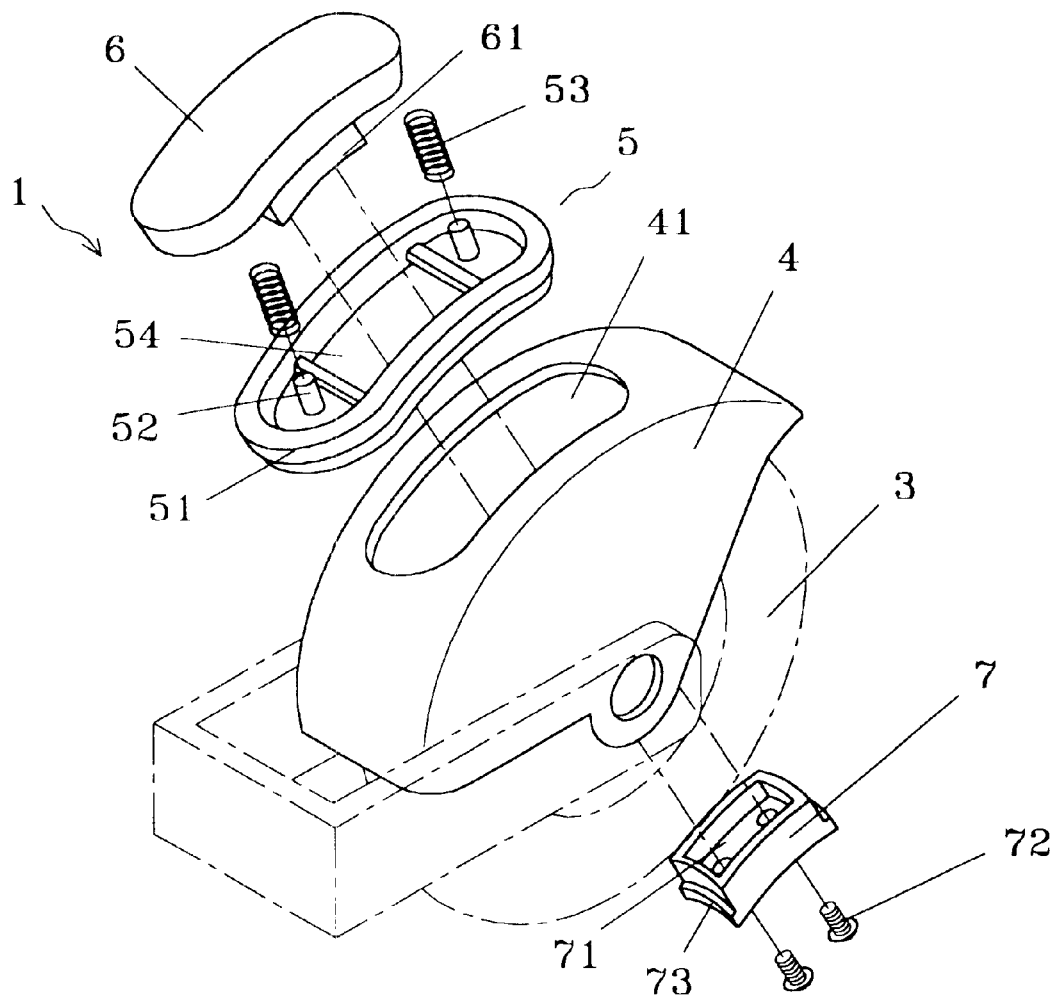
FIG. 2 is a perspective exploded view of a rear wheel brake device of a preferred embodiment in accordance with the present invention.
Figure 3:
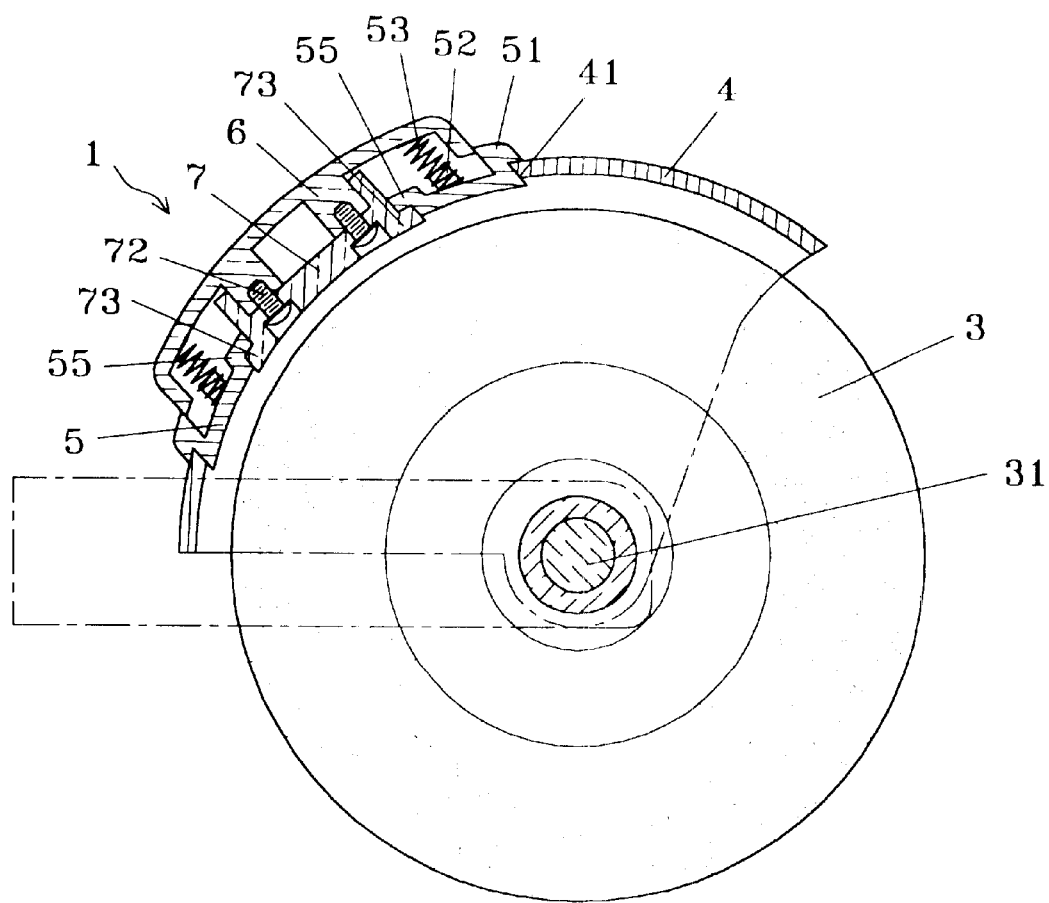
FIG. 3 is a sectional assembly view of a rear wheel brake device of a preferred embodiment in accordance with the present invention.
Figure 4:
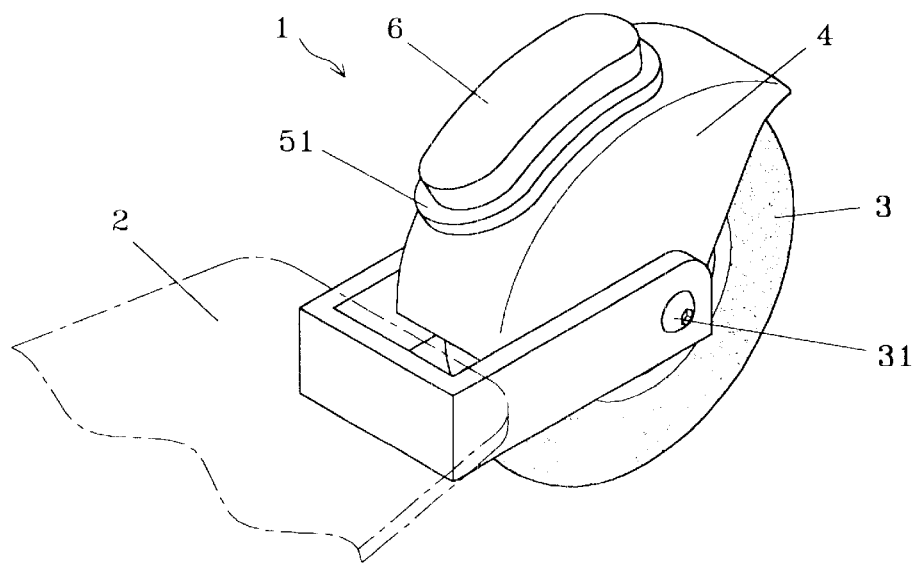
FIG. 4 is a perspective view of a rear wheel brake device of a preferred embodiment in accordance with the present invention.
Figure 5:
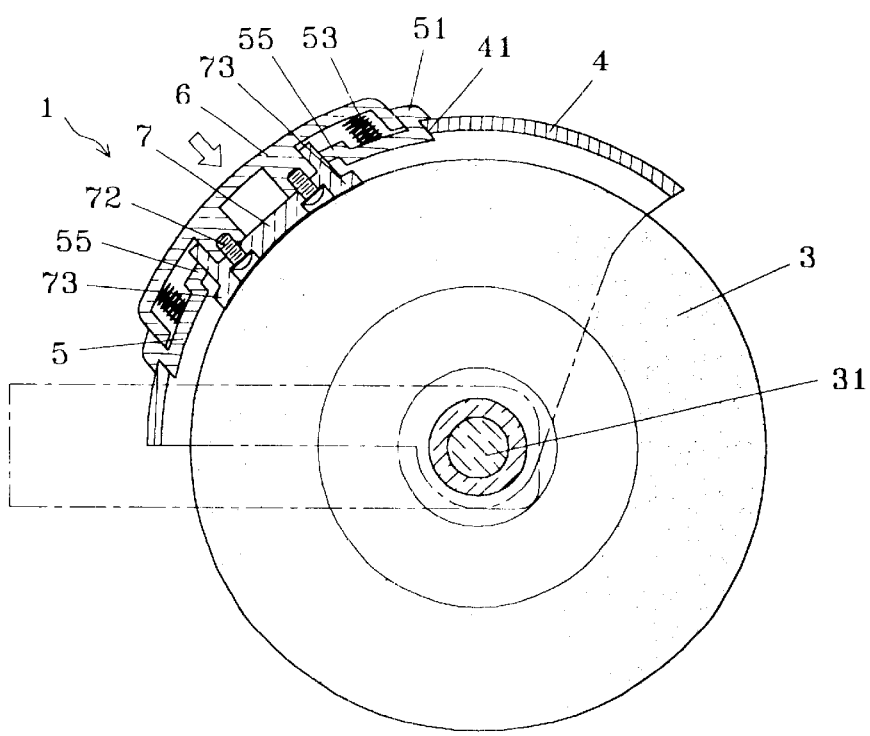
FIG. 5 is a schematic view illustrating an operation of a rear wheel brake device of a preferred embodiment in accordance with the present invention.
Figure 6:
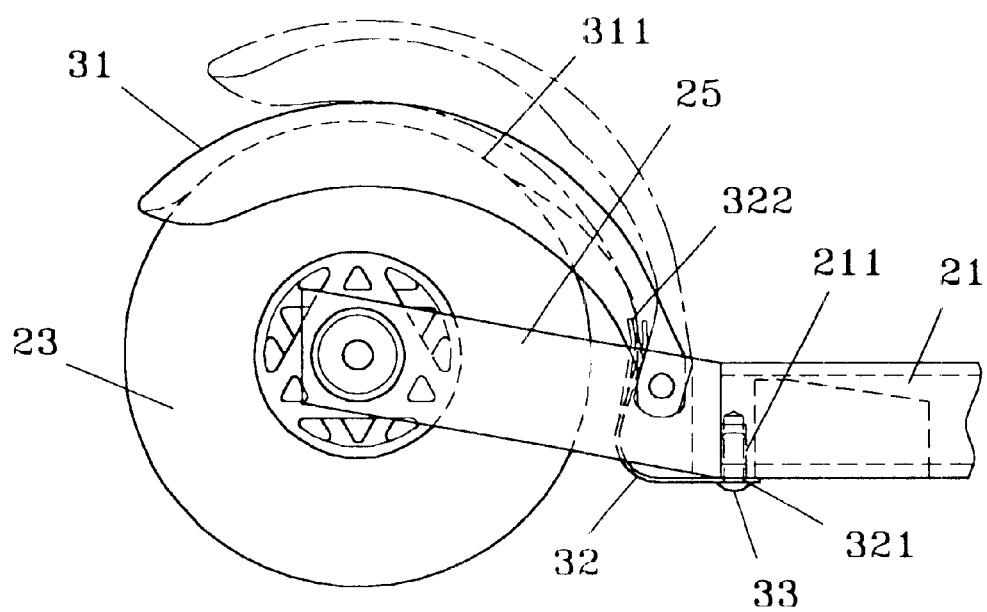
FIG. 6 is an elevational view of a conventional rear wheel brake device of the prior art.

Referring to FIGS. 1 to 5, a skid scooter comprises a board 2, a holding seat 60 disposed on a front portion of the board 2, a down tube 70 inserted in the holding seat 60, a front tube 40 connected to the down tube 70, a handle 30 connected to the front tube 40, a front wheel 50 disposed on a bottom of the front tube 40, a rear wheel 3 disposed on a rear end of the board 2, a rear wheel cover 4 disposed between the board 2 and the rear wheel 3, and a rear wheel brake device 1 disposed in the rear wheel cover 4.

The rear wheel cover 4 has an oblong hole 41.

The rear wheel brake device 1 has a positioning block 5 inserted in the oblong hole 41 of the rear wheel cover 4, two posts 52 disposed on the positioning block 5, and two springs 53 enclosing the posts 52.

The positioning block 5 has a through hole 54 and a periphery flange 51.

An oblong seat 7 has an interior 71.

A movable cover 6 has a lower protruded block 61 passing through the through hole 54 of the positioning block 5 and inserted in the interior 71 of the oblong seat 7.

A shaft 31 fastens the board 2, the rear wheel 3, and the rear wheel cover 4 together.

Two bolts 72 fasten the oblong seat 7 and the movable cover 6 together.

The springs 53 contact the movable cover 6.

The positioning block 5 further has two bottom bars 55.

The oblong seat 7 further has two lateral protrusions 73 engaging with the bottom bars 55.

When the movable cover 6 is pressed downward, the oblong seat 7 contact the rear wheel 3.

The present invention is not limited to the above embodiment but various modification thereof may be made. Furthermore, various changes in form and detail may be made without departing from the scope of the present invention.

I claim:

1. A skid scooter comprises:

a board, a holding seat disposed on a front portion of the board, a down tube inserted in the holding seat, a front tube connected to the down tube, a handle connected to the front tube, a front wheel disposed on a bottom of the front tube, a rear wheel disposed on a rear end of the board, a rear wheel cover disposed between the board and the rear wheel, and a rear wheel brake device disposed in the rear wheel cover, the rear wheel cover having an oblong hole, the rear wheel brake device having a positioning block inserted in the oblong hole of the rear wheel cover, two posts disposed on the positioning block, and two springs enclosing the posts, the positioning block having a through hole and a periphery flange, an oblong seat having an interior, a movable cover having a lower protruded block passing through the through hole of the positioning block and inserted in the interior of the oblong seat, a shaft fastening the board, the rear wheel, and the rear wheel cover together, two bolts fastening the oblong seat and the movable cover together, and the springs contacting the movable cover.

2. The skid scooter as claimed in claim 1, wherein the positioning block further has two bottom bars.

3. The skid scooter as claimed in claim 1, wherein the oblong seat further has two lateral protrusions engaging with the bottom bars.

* * * * *